United States Patent [19]

Alderson

[11] 4,323,043

[45] Apr. 6, 1982

[54] LIQUID FUEL PREHEATING MEANS

[76] Inventor: John M. Alderson, 21332 Bulkhead Cir., Huntington Beach, Calif. 92646

[21] Appl. No.: 118,795

[22] Filed: Feb. 4, 1980

Related U.S. Application Data

[60] Division of Ser. No. 960,713, Nov. 14, 1978, abandoned, which is a continuation of Ser. No. 786,636, Apr. 11, 1977, abandoned.

[51] Int. Cl.$^3$ ............................................. F02M 31/00
[52] U.S. Cl. .................................... 123/557; 123/552
[58] Field of Search ....................... 123/557, 552, 548; 237/123 A; 60/320

[56] References Cited

U.S. PATENT DOCUMENTS

| | | | |
|---|---|---|---|
| 1,147,644 | 7/1915 | Reichenbach | 123/548 |
| 1,319,718 | 10/1919 | Martin | 123/552 |
| 1,734,723 | 11/1929 | Gildehaus | 123/548 |
| 2,197,236 | 4/1940 | Bowen | 123/557 |
| 3,738,334 | 6/1973 | Farr | 123/557 |

FOREIGN PATENT DOCUMENTS 735141  11/1932  France ................. 123/557

*Primary Examiner*—Ronald H. Lazarus
*Attorney, Agent, or Firm*—John H. Crowe

[57] ABSTRACT

A preheating system for internal combustion engine fuels. The parts of the system include a heat exchanger through which the fuel passes in heat exchange contact with exhaust gases from the engine, or, in some cases, the engine coolant. Where the heat exchange contact is with exhaust gas, the fuel is vaporized by heat from the gas prior to its introduction into the engine carburetor. Where the fuel passes in heat exchange relationship with engine coolant, it is heated to a point just below boiling before introduction into the carburetor. Where the fuel is heated by exhaust gas, the parts of the system include an accumulator between the heat exchanger and carburetor which serves the purpose of providing a reservoir of the vaporized fuel sufficient to satisfy any demand of the carburetor. The fuel heating system can be employed with a conventional gasoline carburetor where the heat source for the heat exchanger is the engine coolant. Where the heat source is exhaust gas, however, the engine will require the use of a modified butane carburetor in addition to its regular one, in which case the system includes a thermostatically controlled valve that operates to feed gas to the regular carburetor from engine start-up until the exhaust gas reaches a suitable temperature level, then the valve switches the gas flow from the regular carburetor into the heat exchanger. The incorporation of this system into an automobile results in a remarkable increase in engine efficiency and a decrease in exhaust pollutants.

4 Claims, 5 Drawing Figures

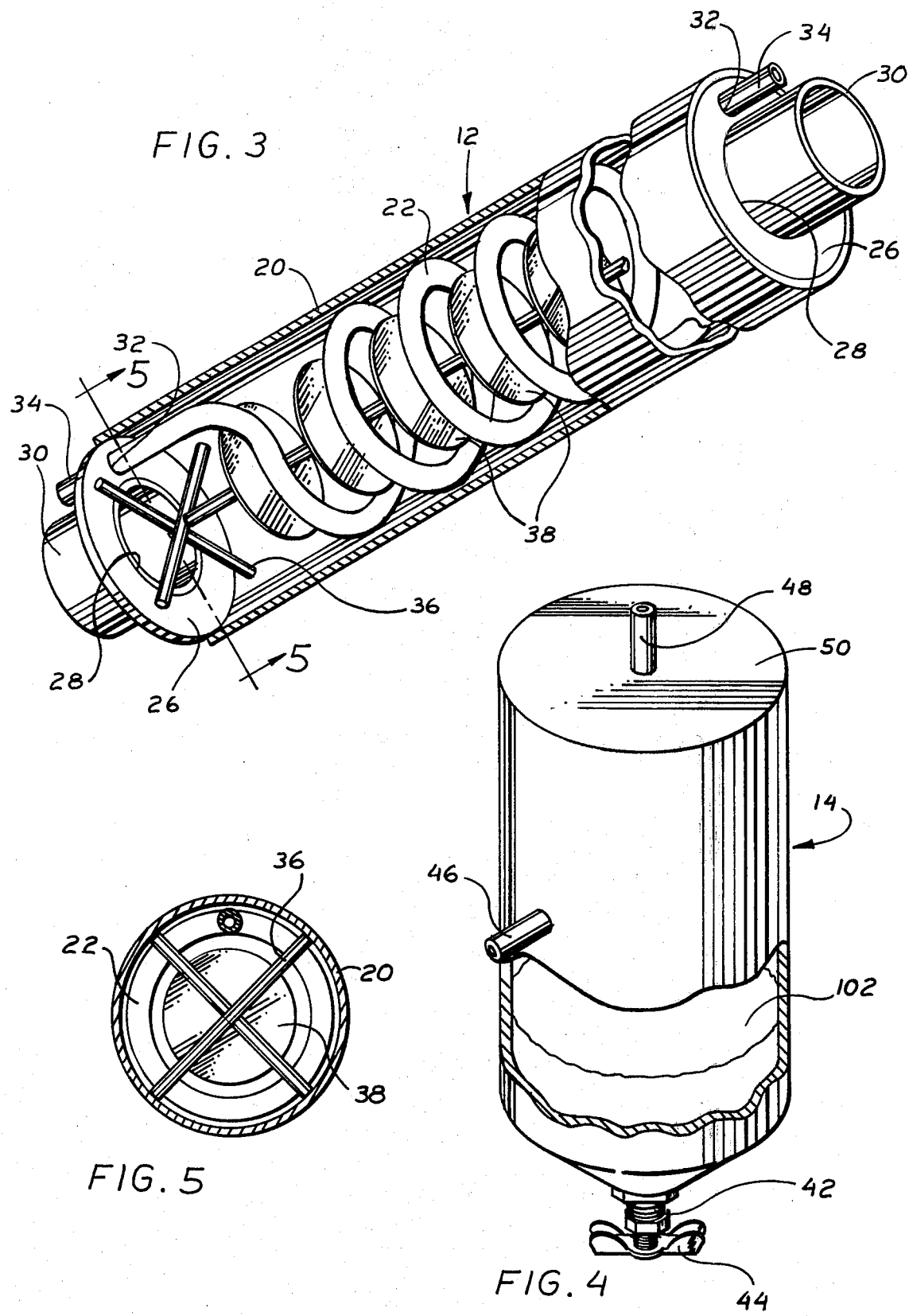

LIQUID FUEL PREHEATING MEANS

This is a division, of application Ser. No. 960,713, filed Nov. 14, 1978, now abandoned, which is a continuation of application Ser. No. 786,636, filed Apr. 11, 1977, now abandoned.

BACKGROUND OF THE INVENTION

This invention relates generally to fuel preheating means for use on heat engines, and more particularly to such means for preheating the gasoline fuel of an automobile or the like, prior to its introduction to the carburetor of the vehicle, through utilization of waste heat from the vehicle's exhaust or, in some cases, from its coolant.

It is well known that gasoline fuel burns most efficiently in an internal combustion engine when it is in the form of a vapor. The conventional carburetor does not convert all of the gasoline passing therethrough into vapor, a substantial portion being, instead, merely broken up into tiny droplets that remain suspended in the intake air when the resulting mixture of fuel and air is drawn through the mainfold and into the cylinders of an engine. While some vaporization takes place, a substantial portion of the gas remains in the form of liquid droplets in the cylinder head at the time the mixture is ignited by the spark. These liquid fuel droplets burn inefficiently, or incompletely, with the result that the engine exhaust contains an excessive amount of unburned hydrocarbons and carbon monoxide as air pollutants which contribute to the formation of atmospheric smog. Nitrogen oxide is also formed, as a smog producing pollutant in the exhaust, because of high combustion temperature in the engine, particularly at the point where the exhaust gases pass through the exhaust ports during the first few degrees of valve opening. These high temperatures are brought about when minute droplets of liquid fuel, still unburned, are vaporized by the heat of combustion to mix with the remaining oxygen, so that afterwards there is delayed combustion at an exceedingly high temperature when the gas is passed between the face of the valve and the valve seat. This high temperature is responsible for formation of the nitrogen oxide found in internal combustion engine exhaust gases.

In addition to the above-noted disadvantages of the incomplete combustion of gasoline brought about by incomplete vaporization thereof in carburetors, there is a further disadvantage in the fact that such incomplete combustion results in deposits of carbon on interior engine surfaces. Furthermore, incomplete fuel combustion is wasteful of energy, a serious enough problem in the past but one which is now approaching catostrophic proportions because of oil shortages in this country and the rising price of imported oil from the oil producing nations.

Various means for preheating the fuel to automobile engines have been proposed in an effort to increase engine efficiency and cut down on exhaust pollutants. All such fuel preheating means of which I am aware have been designed to provide heat to the fuel as it passes between the carburetor and intake manifold of the engine. U.S. Pat. No. 3,762,385 to Hollnagel discloses a device adapted to heat engine fuel in this manner. While such devices are claimed to increase automobile gas mileages and reduce exhaust pollutants, none has yet, to my knowledge, met with any substantial degree of commercial acceptance. In view of the critical need today for more efficient fuel burning engines, the absence of such acceptance of any fuel preheating means heretofore known is clear evidence that no such means capable of meeting the stringent demands of the marketplace has yet been provided. Moreover, those prior art devices adapted to heat gasoline fuel from an engine carburetor prior to its introduction into the intake manifold do nothing to reduce or eliminate any exhaust pollutants resulting from the presence of additives in commercial gasoline fuels. The most common pollutant of this type, to my knowledge, is lead, which is spewed out from millions of automobile exhaust pipes to poison the atmosphere in the vicinity of heavily traveled roadways.

SUMMARY OF THE INVENTION

I have now, by this invention, provided unique means for the preheating of fuel for a heat engine, having particular adaptability for use on automobile engines, to thereby greatly increase the efficiency of the engine, and reduce the pollutants in the engine exhaust. My novel preheating means differs from any pre-existing fuel vaporizing or heating means in that it heats the fuel prior to introduction of the fuel into an engine carburetor, as opposed to other systems that heat the fuel between the carburetor and intake manifold. The invention takes one of two principal forms, the first of which utilizes heat from the engine exhaust for the fuel preheating step and the other of which utilizes heat from the engine coolant, the latter, of course, being suitable for use only on water-cooled engines.

In its first (exhaust-heat) form, the invention preferably comprises a heat exchanger with an internal coil adapted for easy installation in the exhaust system of an automobile, and an accumulator through which the heated fuel passes on its way to engine carburetor. This embodiment of the invention can take the form of a kit for installation of an existing automobile, preferably a new one, or it can be incorporated in the car at the time of its manufacture. The heat exchanger is simply a cylinder housing a coiled fuel line disposed therein, designed for installation in the exhaust pipe of a car for use in such fashion as to permit the exhaust gases to flow through, in contact with the fuel line, on their way to the tail pipe outlet. In passing through the coil, the fuel absorbs sufficient heat from the exhaust to cause its vaporization, so that it leaves the coil in vapor form. From the coil the vaporized fuel flows into the accumulator, which serves as a reservoir in which sufficient volume of fuel vapor is retained to satisfy any demand of the carburetor. In this version of the invention, a modified butane carburetor is employed to meter the vaporized gas from the accumulator to the engine. The accumulator, in addition to providing a reservoir for the vaporized fuel, serves as a trap for the accumulation of "impurities" in the fuel which drop out and collect as a sludge. The bottom of the accumulator has a drain with a pet cock or the like which can be opened to drain the sludge from time to time. These "impurities" are believed to be additives of the type found in commercial gasoline fuels which are not needed after the fuel is vaporized in my heat exchanger and would only serve to foul the engine and pollute the exhaust. Present among these additives, in the case of leaded gas, is tetraethyl lead, which is, I believe, removed in the sludge and thereby disposed of as harmless waste. Otherwise the lead in the gas would be discharged in the engine exhaust as a poisonous effluent, as it is in the case of conventional automobile engines.

Where the exhaust-heat version of my invention is employed, the conventional carburetor for the engine is retained for use from start-up of the engine until the temperature of the exhaust gases in the heat exchanger reaches a certain level, typically about 300° F., after which the fuel is routed through the heat exchanger to the accumulator and modified butane carburetor. To insure this type of operation, the system is provided with a three-way valve controlled by a thermostat positioned to sense the temperature in the heat exchanger. The three-way valve interconnects the fuel line from the fuel pump with two outlet fuel lines going to the conventional carburetor and heat exchanger, respectively. After start-up, while the engine is heating up, the valve automatically routes the fuel to the regular carburetor. When the temperature in the heat exchanger reaches 300° F., the thermostat actuates the valve to route the fuel into the heat exchanger, through which the fuel thereafter flows continuously so long as the engine is running. This warm-up period, prior to actuation of the valve to route the fuel into the heat exchanger, is relatively short, typically about five minutes. As a result of the preheating of the fuel to a vapor in the heat exchanger, remarkable fuel efficiency, and reduction of exhaust pollutants, are achieved. I found, for example, that the use of this system on a ten-year-old Mustang with 91,000 miles on it increased the gas mileage of the car four or five times over its mileage without the system installed.

In the second principal (coolant-heat) form of my invention, a heat exchanger similar to that described above is employed, but this time coolant from the cooling system, rather than exhaust gas, is used as the heat source for the fuel. With this version of the invention, the gasoline fuel is not vaporized in the heat exchanger, but heated to a temperature just below its boiling point. In this state the fuel is passed into the regular carburetor of the engine, and, because it is preheated, it vaporizes much more completely in flowing into the combustion chambers than would otherwise be the case. As a result, the fuel burns more efficiently than it would without the preheating, although not as efficiently as it does when completely vaporized before entering the carburetor, as in the first-described version of my invention. Even here, however, I found that the use of my preheating means on the above-mentioned Mustang increased its engine efficiency to a sufficient extent to double the gas mileage of the car, and substantially reduce the pollutants in its exhaust.

It is thus a principal object of this invention to provide relatively simple and inexpensive means for achieving more complete combustion of gasoline in internal combustion engines than is possible with conventional carburetion systems of the type now in use on such engines.

It is another object of the invention to provide simple, economical means for substantially reducing the air pollutant content of internal combustion engine exhausts to thereby bring about a reduction in atmospheric smog.

It is yet another object of the invention to provide such means having the additional advantage of trapping the lead constituents of certain gasoline fuels to prevent the escape of lead in automobile exhausts to poison the atmosphere in the vicinity of busy highways.

It is still another object of the invention to provide such means in a form capable of relatively easy incorporation in a conventional internal combustion engine system.

Other objects, features and advantages of the invention will become apparent in the light of subsequent disclosures herein.

BRIEF DESCRIPTION OF THE DRAWINGS

FIG. 3 is a perspective view, partially in section and partially broken away, of a heat exchanger element forming a part of the FIG. 1 system.

FIG. 4 is a perspective view of an accumulator comprising a part of the FIG. 1 system, a portion of an outer wall of the accumulator being shown partially broken away for better illustrative effect.

FIG. 5 is a cross-sectional view of the heat exchanger, taken along 5—5 of FIG. 3.

DESCRIPTION OF PREFERRED EMBODIMENTS

Figure 1:
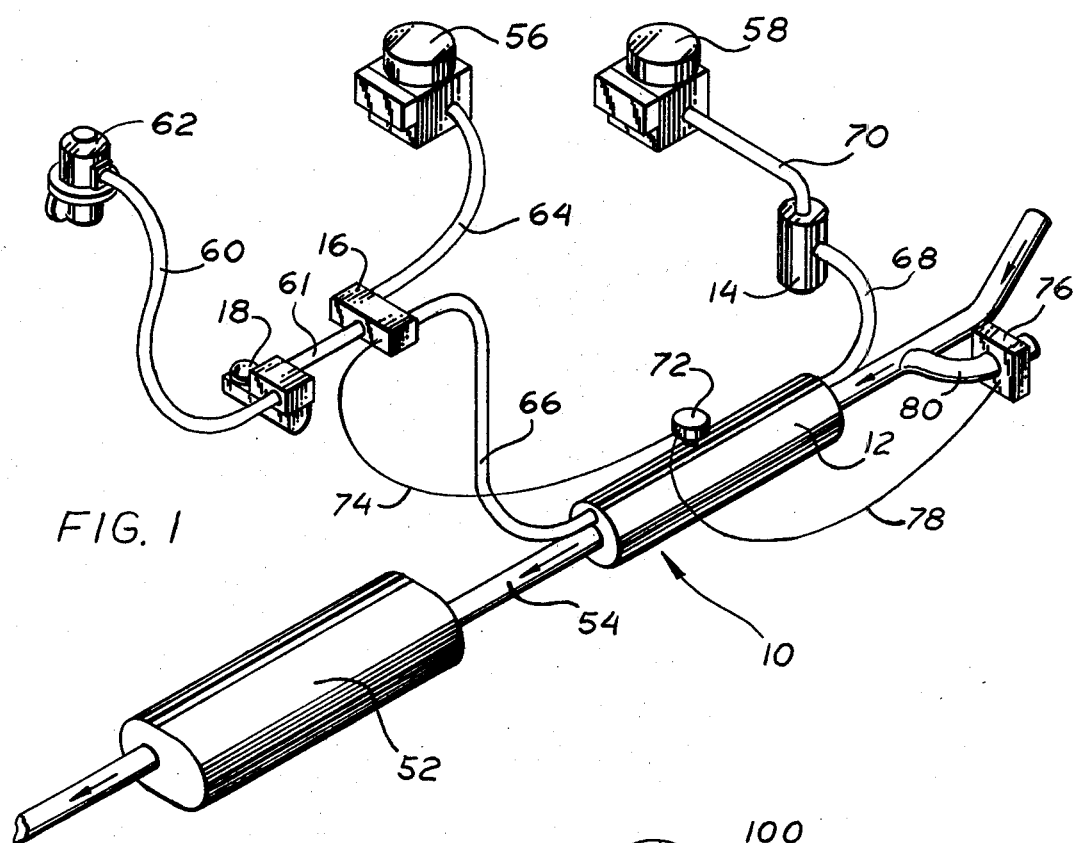
FIG. 1 is a diagramatic view showing the parts of a preferred fuel preheating system in accordance with this invention incorporated in a conventional automobile.

Considering now the drawings in greater detail, with emphasis first on FIG. 1, there is shown generally at 10 a diagramatic view of the parts of a preferred fuel preheating system in accordance with this invention installed on an automobile for use. The principal parts of the system include a heat exchanger 12, an accumulator 14, a solenoid controlled three-way valve 16, an even flow check valve 18, and a modified butane carburetor 58. The heat exchanger 12 has a cylindrical outer shell 20 and an inner coil 22 of tubing wound in a spiral around a rod 24 disposed coaxially of said outer shell (see FIG. 3). Into each end of the cylindrical shell 20 of the heat exchanger is fitted a round plate 26 having a tapped central opening 28 into which is screwed a stub conduit 30 that is threaded at one end to mate with the opening. In addition to the opening 28 in plate 26, there is a smaller opening 32 of round cross-section sized to snugly receive an end 34 of the tubing from which the coil 22 is formed. The rod 24 is supported at the axial center of cylindrical shell 20 by means of two pairs of crossing segments 36 of the same rod stock as that from which it (rod 24) is formed, the segments of each pair being fastened together at right angles to one another, and secured to a separate end of the rod, in the manner illustrated in FIG. 3, showing the pair of segments at the left end of the rod as there seen. The segments 36 are of such length as to fit snugly within the cylindrical shell 20, and rod 24 is of the proper length so that when the cross segments 36 are attached the resulting part fills substantially the full length of the interior of the heat exchanger and will not slide endwise therein to cause rattling.

Secured to rod 24 in spaced apart and parallel relationship are a plurality of circular baffles 38. These baffles are disposed perpendicularly to the rod 24, and their purpose is to break up the flow of exhaust gases through the heat exchanger, as will be explained. They are of small enough diameter to fit within the coil 22 which, as FIG. 3 shows, has an outside diameter less than the inside diameter of the cylindrical shell 20 to permit a loose fit of the coil within the shell. The distance between the baffles is not critical, and can vary considerably. Moreover, an optimum spacing can be easily determined without difficulty, if necessary, by one skilled in the art. The heat exchanger would function even without the baffles, although it serves its purpose more effectively when they are present.

The parts of heat exchanger 12 are formed from any material suitably resistant to corrosion in the presence of exhaust gases, the otherwise satisfactory for the purpose, one example of such a material being steel. The end plates 26 of the heat exchanger can be fastened in position at the end of shell 20 in any known manner such as, in the case of steel or the like, by means of welding. Likewise, the crossed segments 36 of rod stock at the ends of rod 24 can be secured in position by welding, or other suitable, means, as can the circular baffles 38. The heat exchanger can vary in size, but is preferably about three inches in diameter and something like fourteen inches long in its presently contemplated form. The coil 22 is preferably formed from seamless tubing of about 5/16-inch outside diameter, for most cars, and includes a sufficient number of coils to require from about ten to about twenty feet of tubing for an exchanger of the above-noted size. While, as indicated above, the distance between the baffles 38 can vary, this distance, as presently contemplated, is preferably about one and a half inches for the average heat exchanger of the illustrated type.

The accumulator 14 is an enclosed, cylindrically-walled vessel with a conical bottom 40 at the center of which is a drain outlet 42 fitted with a pet cock 44 (see FIG. 4). The accumulator has an inlet fitting 46 about half way up its side and an outlet fitting 48 in the center of its top enclosure, shown at 50.

The assembly of parts comprising the fuel preheating system of this invention can be manufactured and sold as a kit for installation on an existing car, or they can be built into a car during the course of its manufacture to become an integral part of the finished automobile. The FIG. 1 assembly, in particular, lends itself to manufacture and sale in either kit form or as an integral part of a new car. In either event, the relationship of the parts of the assembly to the other parts of the car will be as diagramatically illustrated in FIG. 1. Thus, as that figure shows, the heat exchanger 12 is installed in the exhaust pipe similarly to the way a muffler is installed, such a muffler being shown at 52, and the exhaust pipe at 54, in FIG. 1. The manner of installation of the heat exchanger is such that exhaust gases from the engine pass into the heat exchanger housing through the stub conduit 30 at one end, and out of the housing through the stub conduit 30 at its other end, the direction of flow being as indicated by the directional arrows on FIG. 1. In passing through the heat exchanger housing, the exhaust gases impinge upon the baffles 38, which deflects them outwardly and into contact with the loops of coil 22.

As previously indicated, the fuel preheating assembly or system of FIG. 1 requires the use of a modified butane carburetor in addition to the regular carburetor of an automobile engine, the regular carburetor being shown at 56 and the modified butane carburetor at 58 in FIG. 1. The modification of the butane carburetor (a standard part) involves reduction of the sizes of the idle and intake jet openings and increase of the air intake opening, and can be easily accomplished by one skilled in the art in the light of present teachings. More specifically, I have found that reduction of the idle jet opening from 0.089 to 0.046 inch, reduction of the intake jet opening from 0.312 to 0.208 inch and increase of the air intake opening to one and three quarter inches is normally adequate for the purpose. I do not wish to be limited, however, to these particular opening size modifications, since other modifications can be made within the scope of my invention. Conventional butane carburetors are made with pot metal parts, since these are satisfactory for use with butane. Because the vaporized gas from the heat exchanger coil is, as will be seen, fairly hot, however, it is preferable to further modify the butane carburetor for my purpose by substituting steel parts for most of its pot metal parts. Still another modification of the conventional butane carburetor that I have found useful for my purpose is the substitution of a mechanically operated brass diaphragm for its automatically operating pot metal one.

The modified butane carburetor 58 is mounted on the intake manifold of the engine (not shown) serviced by the regular carburetor 56. Here, as in the case of the various other parts of the FIG. 1 assembly, the installation details are omitted since one skilled in the art would have no difficulty in mounting the carburetor (or other part) in the proper position for use in view of present teachings. In this, as well as all other installation procedures required for the various parts of the FIG. 1 assembly, standard procedures, hardware and tools well known to any mechanic can be employed. Furthermore, all such procedures are well within the skill of any such mechanic.

In the FIG. 1 assembly, a fuel line 60 connects the engine fuel pump, shown at 62, to the even flow check valve 18, and another line 61 runs from the check valve to the three-way valve 16. Another fuel line 64 extends from the three-way valve to the regular engine carburetor 56. Still another fuel line 66 interconnects a second outlet opening from the three-way valve 16 with one end of the tubing coil 22 in heat exchanger 12. The fuel line 66 is connected to the coil at the appropriate end 34 by means of a standard connector or fitting. In like manner, a fuel line 68 is connected to the other end of the coil, and runs to the accumulator 14, where it is connected to the inlet fitting 46 thereof. Finally, a fuel line 70 is connected to the outlet fitting 48 of the accumulator and runs to the modified butane carburetor 58.

A thermostat 72 is mounted on the heat exchanger 12 in such fashion as to sense the exhaust temperature within the heat exchanger. This thermostat is connected in circuit with the solenoid controlled three-way valve 16 by means of a conductor cord 74, and to a solenoid controlled butterfly valve 76 by means of a second conductor cord 78. The threeway valve 16 is normally closed to the flow of fuel from the fuel pump into line 66, and the butterfly valve 76 is installed in a branch air intake tube 80 to be desired in greater detail below. The thermostat 72 is designed to open the three-way valve 16 to the flow of fuel into fuel line 66 when the temperature within heat exchanger 12 reaches a certain level, soon to be revealed, and to open the butterfly valve 76 when that temperature reaches a still higher level, also soon to be revealed. Thermostats of this type are commercially available and familiar to those skilled in the art.

The manner in which the FIG. 1 assembly functions will now be described. When the engine of the car on which the assembly is installed is started cold, the temperature within the heat exchanger 12 is below the level at which the thermostat 72 opens three-way valve 16 to fuel flow into the heat exchanger. The three-way valve, at this point, is open to the flow of fuel into the line 64 leading to the regular carburetor 56. Consequently, the fuel passes through this carburetor and into the intake manifold of the engine. After the engine has run a few minutes, normally, as previously indicated, something like five minutes, the exhaust gases passing through heat exchanger 12 reach a temperature of about 300° F. This is the temperature level at which thermostat 72 opens the three-way valve 16 to the flow of fuel into the heat exchanger. The fuel now flows through the coil 22 in heat exchanger 12 and is vaporized, then passes through fuel line 68 to accumulator 14. From accumulator 14, vaporized fuel flows through the fuel line 70 into the modified butane carburetor 58. From the modified butane carburetor, the fuel, in vapor form, enters the intake manifold of the engine for combustion as a completely dry fuel.

It is desired to keep the vaporized fuel below a certain upper temperature limit, and for that purpose the above-mentioned air intake tube 80 and butterfly valve 76 are installed in the FIG. 1 assembly. As FIG. 1 shows, the air intake tube 80 is merely a branch conduit open at its outer end and connected at its inner end to the exhaust pipe 54 for the admission of cool outside air into the exhaust gases in the exhaust pipe, under controlled conditions, to lower the temperature of the exhaust stream entering heat exchanger 12. To this end, the thermostat 72 is set to open the butterfly valve 76 when the temperature within the heat exchanger reaches 550° F. Thus, the thermostat will see to it that cooling air is sucked into the exhaust stream whenever the temperature within the heat exchanger is 550° F. or above, to maintain the temperature of the vaporized fuel within desired limits. The above-mentioned temperature limits (300°–550° F.) are preferred limits for use in the FIG. 1 system, although they can vary within the scope of my invention so long as the system is functional in the manner taught herein.

Figure 2:
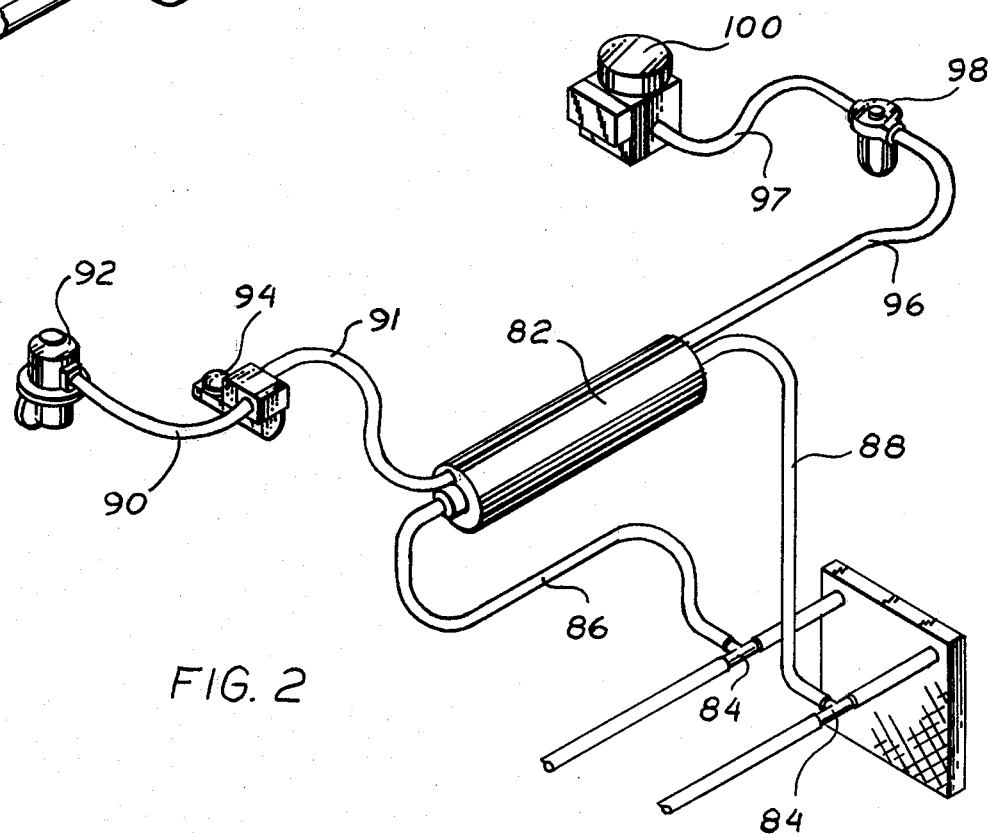
FIG. 2 is a similar type of diagramatic view illustrating an alternative preheating system in accordance with this invention.

The FIG. 2 fuel preheating system is of simpler character than that of FIG. 1, and intended primarily for installation on used cars. While it does not bring about the fuel economy and pollution control of the FIG. 1 assembly, it nevertheless results in great improvement in both fuel economy and pollution control by comparison wih normal car performance. In the FIG. 2 system, a heat exchanger 82 is connected into the coolant lines to the car heater, by means of a pair of tees 84 and two water lines 86 and 88, in the manner illustrated in the drawing. From the fuel pump, shown at 92 on FIG. 2, fuel passes through a fuel line 90 to an even flow check valve 94, and from there, through another line 91, to the heat exchanger 82. During operation of the FIG. 2 engine, not shown, fuel passes through the coil in the heat exchanger, which is identical to that in the heat exchanger coil of FIG. 1, and from there, through a fuel line 96, to a filter 98, from whence it flows to the regular engine carburetor, shown at 100, through a line 97.

When the engine is started up cold, the fuel first passes though the heat exchanger and on into carburetor 100 without being preheated. Soon, however, the engine coolant heats up and eventually reaches a maximum temperature controlled by the usual thermostat in the coolant system, whereat it raises the temperature of the fuel in the heat exchanger to the same level. In the FIG. 2 system, vaporization of the fuel is not desired since the conventional gasoline carburetor 100 is designed to receive liquid fuel and will not function properly if the entering fuel is in the form of a dry vapor. Consequently, the thermostat controlling the coolant temperature should preferably be set at about 180° F., since gasoline boils at 187° F. Fuel passing through the heat exchanger thus leaves that unit at about 180° F. and reaches the carburetor 100 at a temperature close to the boiling point, but still in liquid form. As a result of its high temperature, the fuel is fed to the engine in such condition as to rapidly vaporize and burn more efficiently than it does when it enters in atomized form as in the case of conventional carburetion where no fuel preheating is accomplished. While the presence in heat exchanger 82 of the baffles corresponding to baffles 38 of heat exchanger 12 (FIG. 1) help to improve the heat transfer efficiency of the unit (heat exchanger 82), those baffles could be omitted, if desired, since the unit will function fairly well without them in the FIG. 2 system.

The presence of the even flow check valve 18 in the FIG. 1 system, and the similar check valve 94 in the FIG. 2 system, is necessary to prevent the back flow of fuel into the fuel pump should the pressure in the line exceed that generated by the pump. Thus, if such excessive pressure developed, it would cause the check valve to close till the pressure again dropped to a level below that generated by the pump, at which point the valve would again open to permit the flow of gasoline therethrough.

I have determined experimentally that the accumulator in the exhaust-heat version of my invention functions very effectively to remove certain unwanted components of the vaporized fuel which drop out to form a dark syrupy sludge therein. These components are, I believe, at least in part, the various additives found in commercial gasoline fuels. To illustrate the effectiveness of the accumulator in this regard, during a rather limited test run recently conducted by me, a layer of sludge about half an inch deep formed in an accumulator employed for the run. FIG. 4 shows, at 102, a deposit of such sludge in accumulator 14. This sludge can be readily removed from the accumulator by opening the pet cock 44 and allowing the material to escape through drain 42. For obvious reason, the pet cock should be opened periodically to allow the accumulator to drain, but this operator is so simple that anyone, even a child, can easily perform it without difficulty.

Following are examples which are included to illustrate the effectiveness of the fuel preheating means of this invention in increasing the fuel economy of an automobile engine and reducing the pollutants in the engine exhaust. It is to be understood, of course, that these examples are included for illustrative purposes only.

EXAMPLE I

In this example, the above-mentioned automobile (1967 Ford Mustang with over 90,000 miles on it) was tested for gas mileage in its normal condition and found to run 11.2 miles per gallon under city driving conditions. Under highway driving conditions, the engine achieved 20 miles per gallon of fuel.

EXAMPLE II

The 1967 Mustang employed for the Example I test was again tested for gas mileage, this time fitted with a preheating system in accordance with this invention utilizing hot water from the coolant system as the heat source at a controlled temperature of 180° F. The same test conditions as those of Example I were employed—the gas mileage under city driving conditions was found to be 23.2 miles per gallon, and under highway driving conditions, 32 miles per gallon. Thus, the use of the coolant-heat version of my invention was found to increase the mileage of the car under city driving conditions by more than 100%, and under highway driving conditions, by 60%. These results are better than the 1985 mileage standards, and were achieved even with the less efficient (coolant-system) version of the two principal forms of my invention.

EXAMPLE III

The 1967 Mustang tested in Examples I and II was fitted with preheating means in accordance with this invention utilizing the exhaust gases of the car at a temperature of from 450° to 500° F. as the heat source. The car, thus equipped, was tested for gas mileage by the method employed in Example I and found to have a gas mileage of 40 miles per gallon under city driving conditions, and 73.6 miles per gallon under highway driving conditions. This example demonstrates that the use of heat from exhaust gases as the heat source for my novel preheating means increased city driving mileage on a ten-year-old car by almost 250%, and the highway driving mileage by almost 550%. These results clearly show great superiority of performance of my fuel preheating means over any other known preheating means, at least among those of which I am aware.

EXAMPLE IV

The aforesaid Mustang equipped with the exhaust-heat version of my invention was tested at a California State facility for measuring the pollutants in automobile exhausts, with the following results (average idle, low cruise and high cruise results). Tabulated with these results are the present-day California standards (idle, low cruise and high cruise average) for exhaust pollutants. These standards are for 200 cubic-inch engine cars, within which category my Mustang falls.

TABLE I

| | Exhaust Emissions | | |
|---|---|---|---|
| | Unburned Hydrocarbons (HC) | Carbon Monoxide (CO) | Nitrogen Oxide (NO) |
| 1967 Mustang equipped with preheating means utilizing exhaust gases as heat source | .00157 | 1.07 | .00842 |
| California emission standards (1977) | .00466 | 4.66 | .250 |

Note:
Pollutant quantities are given in grams/mile.

The results of this example show that my novel fuel preheating means enables even a ten-year-old car with high mileage, and (obviously) no catalytic converter, to achieve emission pollutant levels far below those allowed by present-day California standards, the most stringent in the nation. Thus, the ten-year-old test car of this example produced exhausts with an average unburned hydrocarbon content equal to only about one-third of that permitted by the California emission standards. The average carbon monoxide content of the exhaust was even lower, relatively speaking, the quantity of carbon monoxide there being less than 23% of the permissible quantity under the California standards. The reduction in nitrogen oxide content below the California standards level was truly remarkable in this example, the average amount of that extremely harmful pollutant in the test car exhausts having been found to be only 3.2% of that permitted by the standards.

My novel fuel preheating means has certain advantages in addition to those specifically mentioned above. For one thing, its use obviously does away with any need for catalytic converters, thereby eliminating the various problems resulting from the use of such converters. For another, when installed on a used car, it quickly cleans carbon deposits from the car's engine, and when built into a new car it prevents the formation of such deposits. Cars equipped with my novel preheating means are as free from explosion and fire hazard as are conventional automobiles since fuel pressures are kept within the same limits in both cases, fuel systems incorporating the preheating means are sealed against leakage and no temperatures are greater than ordinary manifold temperatures where such systems are employed.

As will be apparent from the foregoing, any gasoline fuel will suffice for purposes of my invention, and particularly the exhaust-heat versions thereof. Since the fuel is vaporized prior to combustion, it burns cleanly and efficiently in engine combustion chambers, causing no ping, regardless of its octane rating or quality. Thus, any low grade gasoline fuel, even white gasoline of the type heretofore used in gasoline lanterns, could be satisfactorily burned in engines equipped with exhaust-heat preheating means in accordance with this invention.

While my novel fuel preheating means has been herein described and illustrated in what I consider to be preferred embodiments, it will be appreciated by those skilled in the art that my invention is not limited to those particular versions, but is broad enough in concept to encompass all modifications thereof incorporative of the structural and functional essence of the invention as taught herein. Some of those modifications have been previously discussed, and others will be evident to those skilled in the art in the light of present teachings. An example of something akin to the latter would be the use of a coil made of a highly heat conductive metal such as copper, rather than steel, in heat exchanger 82 of FIG. 2.

Although I have herein stressed the applicability of my novel fuel preheating means for use on gasoline burning automobile engines with carburetors, it should, of course, be understood that the fuel preheating means has broader use potential than this, and can be employed in any capacity for which its unique character suits it. For instance, it can be used on internal combustion engines with carburetors other than car engines, examples of which include motorcycle, snowmobile, lawn mower, etc., engines. In some form, fuel preheating means in accordance with the principles of this invention could be found that would have applicability for use on any engine with a heat source available for tapping, such as, for example, a fuel injection engine, a rocket engine, or the like.

In summary, it is emphasized that the present invention includes within its scope all variant forms thereof encompassed by the language of the following claims.

I claim:

1. Liquid fuel preheating means particularly adaptable for use on a gasoline burning internal combustion engine equipped with a regular carburetor and a fuel pump, comprising:

heat exchanger means with first passage means for feed fuel to the engine and second passage means for a hot fluid incident to normal operation of the engine, the two passage means being so oriented that the concurrent flow of feed fuel and said hot fluid respectively therethrough results in heat transfer from the hot fluid to the fuel; and accessory means for retaining the heat exchanger means in such position that feed fuel to said engine passes through said first passage means prior to carburetion of the fuel, when the engine is running, said accessory means including means for integration of said heat exchanger means into the entire exhaust system so that exhaust gas passes through said second passage means as said hot fluid to heat fuel passing through said first passage means and thereby vaporize the latter;

said heat exchanger means comprising an enclosed cylindrical housing, with an opening in each end for the passage of exhaust gas, and a coil of tubing, said coil being positioned within said housing and being adapted to receive liquid fuel for the engine at one end and discharge vaporized fuel at the other end, said coil being coaxially disposed within said housing;

said coil serving as said first passage means for said feed fuel and the space surrounding the coil within said cylindrical housing serving as said second passage means for said exhaust gas;

said liquid fuel preheating means including an accumulator and means for conducting the vaporized fuel from said heat exchanger means thereinto prior to carburetion of the fuel, said accumulator comprising a vessel for containment of a quantity of the vaporized fuel adapted to satisfy the fuel demands of the engine during operation thereof;

said accumulator being provided with valve and drain means and being adapted to trap nongaseous components of the vaporized fuel, whereby such nongaseous components collect as a sludge in the accumulator that can be periodically removed through said drain means;

said liquid fuel preheating means including a special carburetor adapted to receive vaporized fuel from said accumulator and feed the proper ratio of fuel and air to said engine for proper operation of the latter;

said liquid fuel preheating means also including air inlet means for admitting ambient air into said exhaust system upstream of the position of said heat exchanger means therein; a thermostatically-controlled valve in said air inlet means; a thermostatically-controlled three-way valve adapted to alternately admit said liquid fuel to said regular carburetor and to said heat exchanger means, said three-way valve being normally open to fuel flow to said regular carburetor and closed to fuel flow to said heat exchanger means; thermostat control means adapted to sense the temperature within said second passage means in said cylindrical housing of said heat exchanger means and open the three-way valve to fuel flow into said heat exchanger means at a first temperature level and to open said valve in said air inlet means at a second temperature level; whereby upon start-up of the cold engine, fuel first flows to said regular carburetor and continues that flow until said first temperature level is reached within said heat exchanger means whereat the thermostat control means actuates said three-way valve to switch the fuel flow into said heat exchanger means, and when the temperature within said heat exchanger means reaches said second level said thermostat control means opens said valve in said air inlet means to admit air into said exhaust system to cool the exhaust gas therein for improved operation of said engine.

2. Fuel preheating means in accordance with claim 1 including an even flow check valve adapted to prevent the back flow of fuel into said fuel pump should the pressure in the fuel system downstream of the pump exceed the pump pressure.

3. Fuel preheating means in accordance with claim 2 including a plurality of baffles so positioned within said second passage means as to deflect the flow of exhaust gas therethrough into good contact with said coil for the transfer of heat from said gas to fuel within the coil, and support means for holding said baffles in their above indicated positions.

4. Fuel preheating means in accordance with claim 1 in which said baffles are of flat, circular form and positioned concentrically within said coil and perpendicular to the axis of the coil.

* * * * *